W. M. HAYNIE.
Kiln for Drying and Curing Hops.
No. 64,220. Patented April 30, 1867.
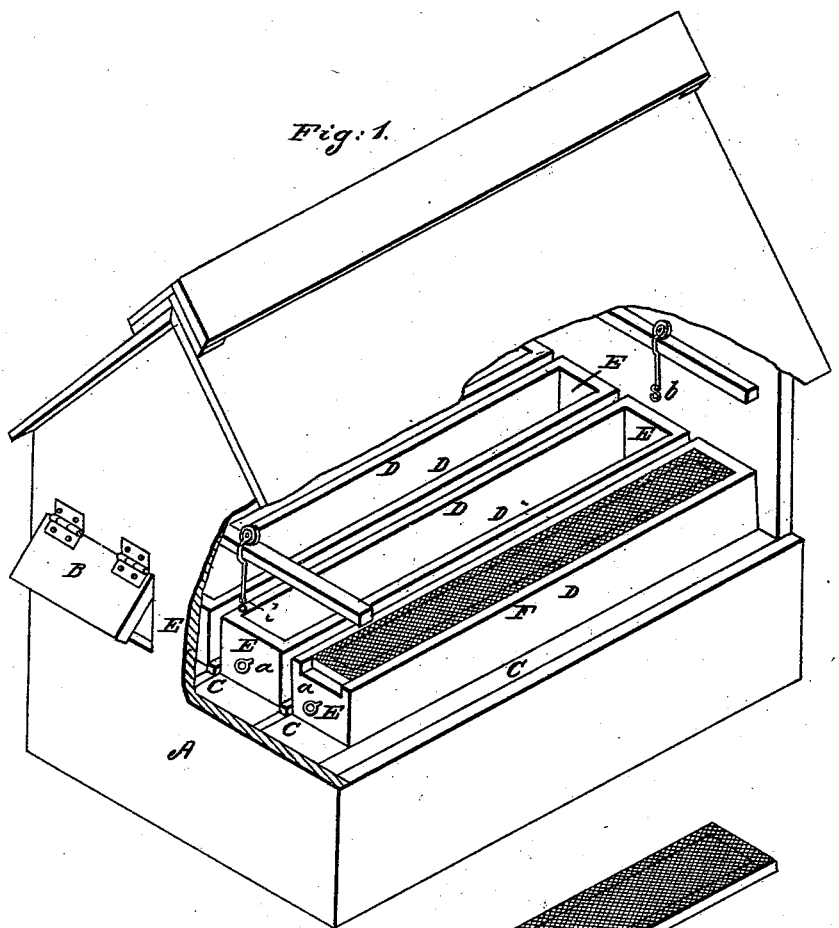
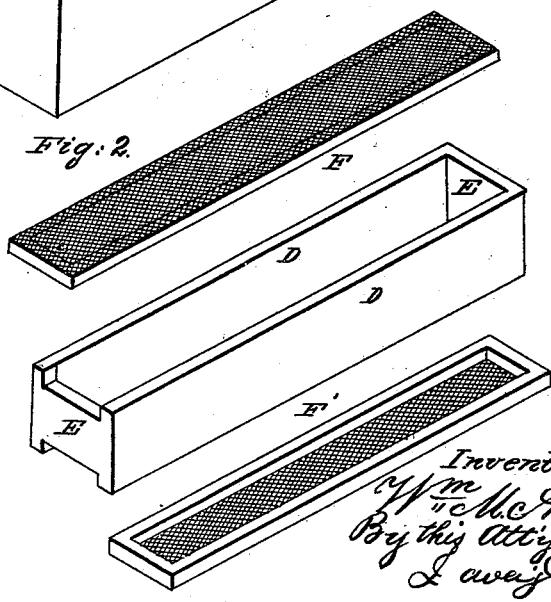

United States Patent Office.

WILLIAM MACEY HAYNIE, OF SACRAMENTO COUNTY, CALIFORNIA.

Letters Patent No. 64,220, dated April 30, 1867.

IMPROVEMENT IN KILNS FOR DRYING AND CURING HOPS

The Schedule referred to in these Letters Patent and making part of the same.

TO ALL WHOM IT MAY CONCERN:

Be it known that I, WILLIAM MACEY HAYNIE, of the American township, Sacramento county, State of California, have invented a new and improved Kiln for Drying and Curing Hops; and I do hereby declare the following description and accompanying drawings are sufficient to enable any person skilled in the art or science to which it most nearly appertains to make and use my said invention, without further invention or experiment.

The nature of my invention relates to a kiln for drying hops, so constructed that the labor and time will be greatly lessened, while the hops are much more evenly and thoroughly dried, and in a finer condition for market.

To effect this, I construct a kiln with furnaces for heating, above which I place long boxes having the bottom made of a material having meshes to allow free access to the heat. The top is constructed in a similar manner, and both top and bottom form slides, which may be removed at pleasure. When the boxes are filled with hops and placed in the kiln, the top is left open until it is necessary to turn the hops. It is then slid in, and the box raised and attached to hooks by an eye at each end, which allows the box to be turned bottom up and then returned to its place. The bottom is then removed, leaving what is now the upper surface exposed.

To more fully explain my invention, reference is had to the accompanying drawings, forming a part of this specification, of which—

Figure 1 is a perspective view of the kiln, with the boxes in place.
Figure 2 is a view of a box and its sliding covers.
Similar letters indicate like parts in each of the figures.

A is a hop-kiln, having the doors B, through which the boxes are introduced and withdrawn. The lower part of the structure contains furnaces or heaters. C C are beams, which serve as ways, having rollers for the boxes to move easily on and to retain them in place. The boxes consist of the sides D D and ends E E, and are made of any suitable dimensions for convenient handling. The slides F and F, which form the bottom and top of each box, are constructed to move in a groove or any device to retain them in place, and allow them to be easily removed. The sides and ends of these slides may of wood to keep them in place and shape, while the principal part of the surface consists of coarse meshes, to allow the heat to pass up and circulate freely. When a box is filled with hops, it is placed in the kiln, the slide which serves as a bottom being in place. After remaining in the first position for a sufficient length of time, the upper slide is introduced, and the box is raised, and, by means of an eye, $a$, (shown in the drawings,) is attached to a hook, $b$. This hook is attached by a rope to a traveller, which moves across the building, so as to be used over any box that needs turning. After attaching the eye to the hook, the box, which then hangs on a pivot, may be quickly reversed, and the slide, which is then at the top, can be removed. When thoroughly dry, the boxes may be removed to the cooling-room, and the hops baled.

By using this apparatus the hops are not broken, and thus deteriorated in value, and they may be packed so that the hops will be of nearly the same quality throughout the bale, the fibres not having been broken by constant turning and handling.

Having thus described my invention, what I claim, and desire to secure by Letters Patent, is—

A hop-kiln, constructed with boxes, having the slides F F, or their equivalents, substantially as and for the purpose described.

In witness whereof I have hereunto set my hand and seal.

WM. M. HAYNIE. [L. S.]

Witnesses:
GEO. H. STRONG,
W M. SMITH.